G. P. J. LION.
DEVICE FOR CARBURETING AIR.
APPLICATION FILED MAR. 16, 1912.
1,065,819. Patented June 24, 1913.
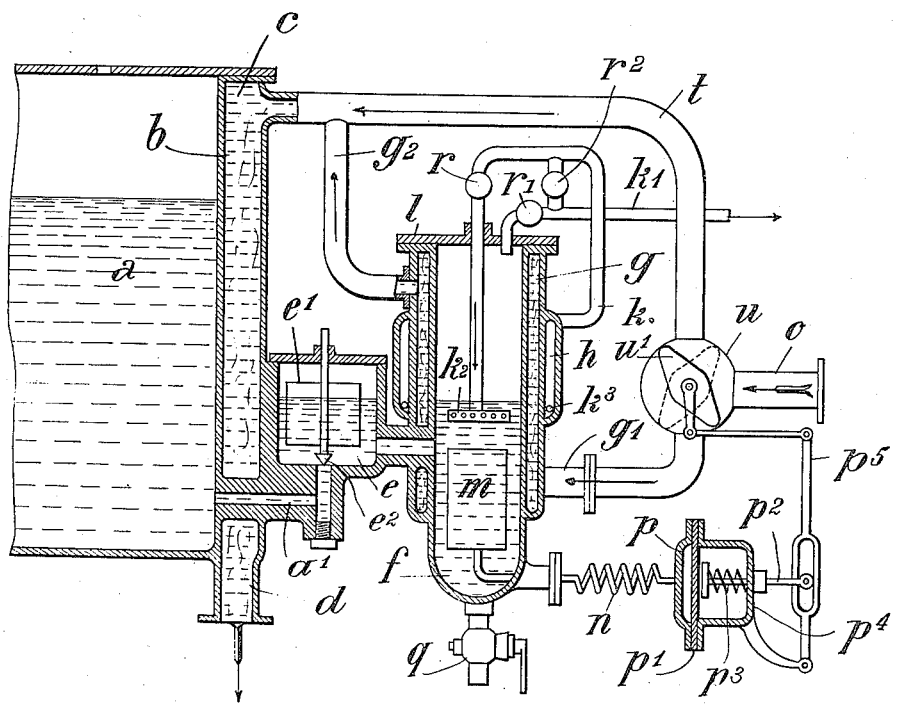
Witnesses:
H. W. Brooks
Geo. W. Kirkley
Inventor:
Gaston Paul Jean Lion
By Beeler & Robb
H. C. Robb, Attorneys

UNITED STATES PATENT OFFICE.

GASTON PAUL JEAN LION, OF LEVALLOIS-PERRET, FRANCE.

DEVICE FOR CARBURETING AIR.

1,065,819.  Specification of Letters Patent.  Patented June 24, 1913.

Application filed March 16, 1912. Serial No. 684,234.

*To all whom it may concern:*

Be it known that I, GASTON PAUL JEAN LION, a citizen of the French Republic, and resident of Levallois-Perret, Seine, France, have invented certain new and useful Improvements in Devices for Carbureting Air with Crude Naphthalene, of which the following is a specification.

The present invention relates to a device by means of which crude naphthalene may be used for carbureting the air of explosion motors. It is a well known fact that such crude naphthalene cannot be used in motors because of the deposit of impurities contained in said crude material.

The improvement consists in that the crude naphthalene is melted at a moderate temperature in a common or main tank, this melting being produced by the exhaust gases of the motor. Said main tank feeds a smaller one, which is a float chamber, said float chamber being disposed in such a manner that it can be heated to the boiling temperature of the naphthalene. The float chamber is connected with a third chamber from which air carbureted with naphthalene, or pure naphthalene vapors only, may be drawn by the motor. The impurities of the crude naphthalene, such as heavy oils, tars and the like separate and collect at the bottom of the last named chamber from which they may be evacuated by means of a cock.

The accompanying drawing is a vertical cross section of the invention.

$a$ is the supply tank of preferably rectangular shape, the longer wall of which is provided with a lateral chamber $b$ forming a heating jacket through which flow the exhaust gases of the motor for producing the preliminary melting of the crude naphthalene. The supply tank $a$ is connected with the float chamber $e$ by means of a tube $a^1$. The float $e^1$ of this second tank or chamber works on a valve $e^2$ which controls the connecting duct $a^1$. The float chamber $e$ is preferably integral with the supply tank $a$ so that it is adjacent to the heating jacket $b$, the adjacent surface being large enough for maintaining the melting temperature of the naphthalene in said float chamber $e$. Said float chamber $e$ is connected with a carbureting chamber $f$ and consequently the level of the liquid in the latter is the same as in the float chamber. Said chamber $f$ is also provided with a heating jacket $g$ which surrounds a part of the carbureting chamber $f$ and into which part of the exhaust gases enter through $g^1$ and escape through $g^2$. A second jacket $h$ surrounds the first one $g$ and serves for heating air drawn through the suction valves $k^3$ and which flows from the jacket through the tube $k$ and bubbles through the strongly heated crude naphthalene mass in the chamber $f$, said air entering the naphthalene through downwardly directed ports of a ring $k^2$ and leaving the tank $f$ through the tube $k^1$.

The top of the carbureting chamber is tightly closed by means of a cover $l$ through which extends the depending pipe $k$ and the outlet pipe $k^1$. At its lower end it is provided with an exhaust cock $q$ for evacuating the precipitates or deposited impurities from the naphthalene.

Within the naphthalene mass is provided an absolutely tight hollow body $m$ which is connected by means of a capillary tube $n$ with the temperature regulating diaphragm apparatus hereinafter described.

The exhaust piping $o$ of the motor is connected with a valve casing $u$ in which a distributing flap valve $u^1$ is movable. According to the position of the valve $u^1$, it will permit the exhaust gases to pass through $g^1$ to the heating jacket $g$ of the chamber $f$ (from which they flow through the tube $g^2$ to the heating jacket $b$) or permit a part or the whole of said gases to pass direct through the pipe $t$ to said jacket $b$.

In the hot air inlet pipe $k$ and outlet pipe $k^1$ of the chamber $f$ are inserted cocks $r$, $r^1$ respectively and between the pipes $k$ and $k^1$ is inserted a connection having a third cock $r^2$, so that it is made possible to draw carbureted hot air or naphthalene vapors only, at will.

The temperature regulating device comprises a round cup or tray $p$ over the circular edge of which is stretched a rubber diaphragm which bears against one end of a rod $p^2$ provided with a spring $p^3$ and guided in a stirrup $p^4$, said rod $p^2$, by means of the connecting lever $p^5$, regulating the distributing valve $u^1$ according to the temperature of the tank $f$.

The device works as follows: When the motor is started by means of usual fuel (such as gas, kerosene, benzin or the like) and has worked for a few minutes, the exhaust gases from $o$ are conveyed through the heating jacket $g$ of the chamber $f$ and then through the heating jacket $b$ of the tank $a$ and float chamber $e$, (while the valve $u^1$ is in the position shown in dotted lines) so that after a time the naphthalene will boil in $f$ and will melt in $a$ and $e$. It is to be noted that the same heating jacket serves at one and the same time for both tank $a$ and chamber $e$, due to the location of the respective parts. Meanwhile the temperature regulating device controlled by the body $m$ has rotated the valve $u^1$ to the position shown in full lines and which corresponds to the desired temperature which must be kept in the tank, said valve correspondingly throttling the flowing of the exhaust gases. This is obtained by the expansion of the air contained in the body $m$ which presses the diaphragm $p^1$ outward and consequently moves the valve $u^1$ by means of the rod $p^2$ and the lever $p^5$. It will be understood that the crude naphthalene in the chamber $f$ may be maintained at a desired degree of heat by correspondingly adjusting the tension of the regulating spring $p^3$ of the diaphragm.

During the operation described the cocks $r$ and $r^1$ are kept closed, and the cock $r^2$ open, so that the motor, by means of suction valves $k^3$, draws some strongly heated air through the air jacket $h$, pipe $k$, cock $r^2$ and pipe $k^1$. It will be understood that the pipe $k^1$, which cannot be heated by conduction, is heated by the air drawn in to such a degree that the naphthalene may flow through it without any danger of said tube being obstructed by the solidification of the naphthalene. Now the motor can be fed with naphthalene in two ways, by sucking air which is oversaturated with naphthalene vapors in the chamber $f$ or by sucking naphthalene vapors only:

*First case: Air saturated with naphthalene vapors.*—The motor duct for the feeding of gas, benzin or the like is closed and immediately the cocks $r$ and $r^1$ are opened and the cock $r^2$ is closed. The motor draws by suction through the pipe $k^1$ above the naphthalene of the tank $f$. Hot air proceeding from the jacket $h$ enters through the pipe $k$ and bubbles through the naphthalene from the perforated ring $k^2$. By virtue of this bubbling action, only the most volatile naphthalene vapors are forced to the motor, while the heavier oils, which constitute the impurities of the crude naphthalene, remain within the chamber $f$. The mixture of naphthalene and air is finally added to the fresh air which is provided by the usual carbureter (without carbureting vapors) for providing the explosive mixture.

*2d case: Naphthalene vapors only.*—The process is the same but the cock $r$ is closed. The air does not enter through the ring $k^2$, but the suction which is produced above the naphthalene at $f$ will draw the desired amount of naphthalene vapors from the boiling naphthalene.

What I claim is:

1. In a device for carbureting air with crude naphthalene vapors, the combination, with a supply tank and a carbureting chamber communicating therewith, of a heating jacket for the supply tank, a heating jacket for the carbureting chamber, an engine exhaust pipe communicating with the jacket of the carbureting chamber, a pipe leading from the jacket of the carbureting chamber to the jacket of the supply tank, and means independent of the carbureting chamber jacket for direct communication from said exhaust pipe to the jacket of the supply tank.

2. In a device for carbureting air with crude naphthalene vapors, the combination, with a supply tank and a carbureting chamber communicating therewith, of a heating jacket for the supply tank, a heating jacket surrounding and extending longitudinally of the carbureting chamber, an engine exhaust pipe communicating with the lower portion of the carbureting chamber jacket, a pipe affording communication between an upper portion of the carbureting chamber jacket and an upper portion of the jacket for the supply tank, and means of direct communication between the exhaust pipe and the upper portion of the jacket for the supply tank.

3. In a device of the class described, the combination, with a supply tank, of a carbureting chamber communicating therewith, a heating jacket surrounding the carbureting chamber, a hot air jacket surrounding the heating jacket, means for delivering heating medium to the heating jacket, means for delivering heating medium from the heating jacket to a point for heating the supply tank, and means for delivering air from the air jacket to the interior of the carbureting chamber for carburetion.

4. In a device of the class described, the combination, with a carbureting chamber and means for supplying naphthalene thereto, of a heating jacket surrounding the carbureting chamber, a hot air jacket surrounding the heating jacket, a tube leading from the hot air jacket to within the carbureting chamber and extending below the naphthalene level therein, a distributing tube leading from the carbureting chamber from a point above the naphthalene level therein, a by-pass affording direct communication between the air supply pipe and the distributing pipe, and valves for the by-pass and pipes for enabling the delivery through said supply pipe of hot air, carbureted air, or pure naphthalene vapors.

In testimony whereof I have hereunto set my hand in presence of two witnesses.

GASTON PAUL JEAN LION.

Witnesses:
　EDWARD W. BIESEL,
　BARTLEY F. YOST.